Patented Oct. 15, 1940

2,218,299

UNITED STATES PATENT OFFICE 2,218,299

METALLIFEROUS AZO DYESTUFFS CONTAINING SIMULTANEOUSLY THE PYRAZOLONE RING AND THE THIAZOL RING

Max Schmid, Riehen, Switzerland, assignor to the firm Society of Chemical Industry in Basle, Basel, Switzerland No Drawing. Application May 18, 1938, Serial No. 208,703. In Switzerland May 22, 1937

5 Claims. (Cl. 260—147)

This invention relates to a manufacture of new metalliferous azo dyestuffs containing simultaneously the pyrazolone ring and the thiazol ring which are distinguished by very good properties of fastness, particularly by an excellent fastness to light of their dyeings on cotton, by combining a $\mu$-phenylarylthiazole in which the $\mu$-phenyl nucleus is linked to a 5-pyrazolone residue with a diazo-compound substituted in ortho-position to the diazo-group by a group which in combination with the enolisable CO-group of the pyrazolone is capable of yielding complex metal compounds, or by a substituent which is capable of being converted into such a group, and then converting the product so obtained into a complex metal compound, whereby the conversion of a substituent in ortho-position to the diazo-group into a group which in combination with the enolisable CO-group of the pyrazolone is capable of yielding complex metal compounds may occur simultaneously with the conversion into a complex metal compound.

Among the diazo-components suitable for use in carrying out the invention there may be mentioned, above all, 1-aminobenzene-2-carboxylic acid, 1-aminobenzene-4-nitro-2-carboxylic acid, 1-amino-benzene-4-sulfo-2-carboxylic acid and the ethyl ester of 1-amino-benzene-2-carboxylic acid; furthermore, 1-amino-4-chloro-2-hydroxybenzene, 1-amino-4-nitro-2-hydroxybenzene, 1-amino-2-hydroxybenzene-4-sulfonic acid, 1-amino-2-hydroxybenzene-4:6-disulfonic acid, 1-amino-2-chlorobenzene-4-sulfonic acid,1-amino-2-methoxybenzene-4-sulfonic acid, 1-amino-2-hydroxynaphthalene-4-sulfonic acid, 2-amino-1-hydroxynaphthalene-4:8-disulfonic acid and the like.

Among the $\mu$-phenylarylthiazole derivatives which come into consideration as coupling components may be named: the condensation products from aceto-acetic esters or oxalacetic esters and the hydrazine obtained by treatment of di-

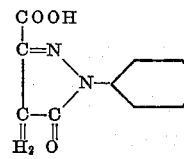

azotized dehydrothiotoluidine with a reducing agent, that is to say products such as

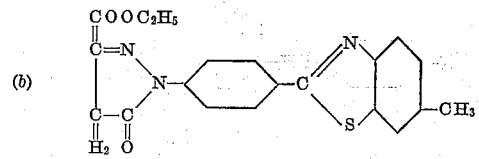

the condensation products from 1-phenyl-3-methyl-5-pyrazolone-3'- or -4'-carboxylic acid and dehydrothiotoluidine or dehydrothioxylidine, sulfonic acids of such compounds, that is to say products such as

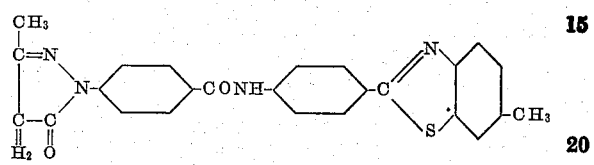

or

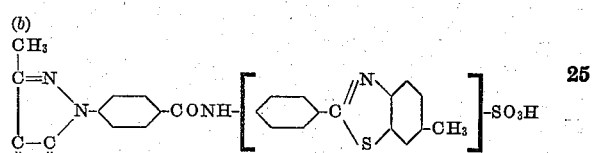

or

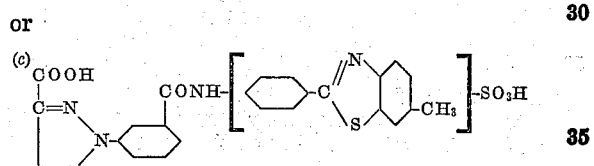

the unsymmetrical urea from 1-(4'-amino)-phenyl-5-pyrazolone-3-carboxylic acid and dehydrothiotoluidine sulfonic acid of the formula

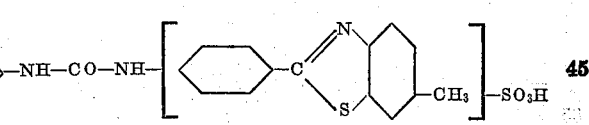

or similarly constituted products resulting from the combination of aminoaryl-5-pyrazolones and $\mu$-aminophenylarylthiazoles by means of compounds containing at least two reactive halogen atoms, such as cyanuric chloride, for example the ternary condensation product from 1 mol of cyanuric chloride, 1 mol of 1-(4'-amino)-phenyl-5-pyrazolone-3-carboxylic acid, 1 mol of dehydrothiotoluidinesulfonic acid and 1 mol of aniline, and so on, that is to say products such as

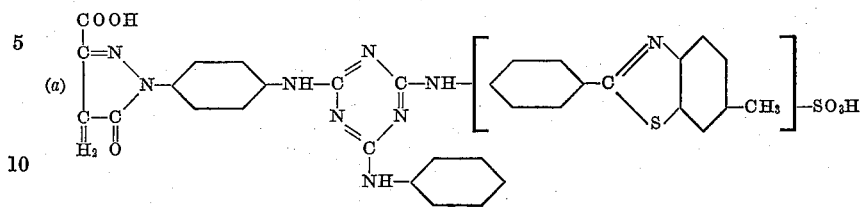

or

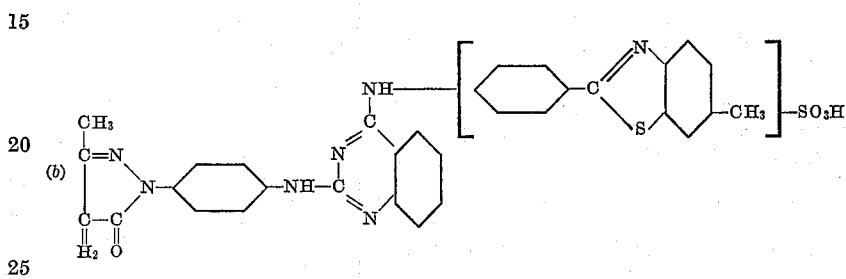

The dyestuffs may be converted into their metal compounds by treatment with a salt, oxide or hydroxide of a metal which yields complex compounds with mordant dyestuffs, such as a salt of copper, nickel, cobalt, iron, chromium, manganese or the like. The metallisation may be conducted simultaneously with the coupling operation for producing the azo-dyestuff or it may occur only when the dyestuff is used, for instance during dyeing, or it may occur on the fibre. Finally, the treatment with an agent yielding metal may be combined with the conversion of an indifferent substituent in ortho-position to the azo-group into a substituent capable of forming lakes. Thus a chlorine atom may be converted into a hydroxyl group or a $COOC_2H_5$-group into a COOH-group.

The new dyestuffs obtainable by the invention are particularly suitable for dyeing cellulose or regenerated cellulose, such as cottom, ramie, linen, cuprammonium artificial silk and viscose artificial silk. They dye these fibres yellow to orange and brown shades which are distinguished by high fastness properties.

The new products represent therefore the metal compounds of the azo-dyestuffs which are characterized, on the one hand, by the presence of an azo-dyestuff grouping of the general formula

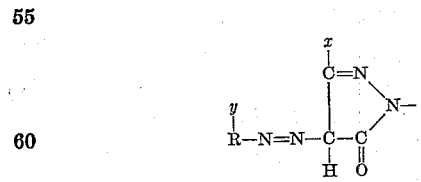

wherein R stands for a nucleus selected from the group consisting of aromatic nuclei of the benzene and naphthalene series, y stands for a substituent selected from the group consisting of COOH and OH groups standing in ortho-position to the —N=N-group, and x stands for a substituent selected from the group consisting of $CH_3$, COOH, COO-alkyl and phenyl, and, on the other hand, by an arylthiazol grouping, the two groupings being linked by a connecting member which consists of at least one and not more than two benzene nuclei linked with each other by a connecting member selected from the group consisting of

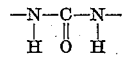

and

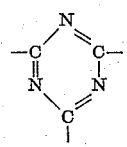

these benzene nuclei being further linked, on the one hand, to the 1-position of the pyrazolone nucleus and, on the other hand, to the μ-position of the arylthiazol nucleus, which products, also when produced on the fiber itself, are yellow to brown powders dyeing the fiber fast yellow to orange and brown tints.

*Example 1*

21.8 parts of 1-phenyl-3-methyl-5-pyrazolone-4'-carboxylic acid and 32 parts of the dehydro-thiotoluidine-mono-sulfonic acid, prepared by sulfonating dehydrothiotoluidine with sulfuric acid monohydrate, are introduced into 10 times the quantity of a mixture of pyridine and dimethylaniline and 6 parts of phosphorus trichloride are added at 120° C. The whole is heated for 6 hours and after addition of 27 parts of anhydrous sodium carbonate the reaction mixture is distilled with steam. It is then made distinctly alkaline by the addition of some sodium carbonate and filtered. The new condensation product is isolated from the filtrate by acidification and is purified by recrystallization of its alkali salt. The same condensation product can be obtained by condensing para-nitrobenzoyl chloride with dehydrothiotoluidinemonosulfonic acid, reducing the nitro-group to the amino-group, diazotizing and converting into the hydrazine and condensing the hydrazine with ethylacetoacetate. It corresponds most probably with the formula

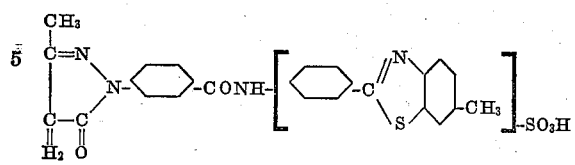

52 parts of this condensation product are dissolved in water with the addition of 25 parts of anhydrous sodium carbonate and the solution is mixed with a suspension of the diazo-compound from 21.7 parts of 1-amino-4-sulfobenzene-2-carboxylic acid. After some time some sodium chloride is added and the azo-dyestuff formed of the formula

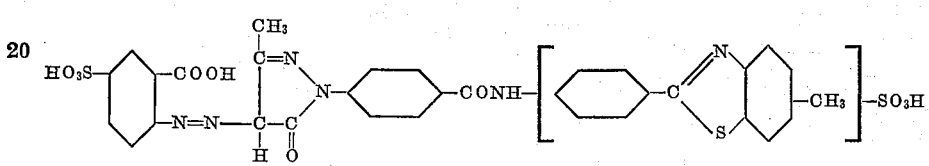

is filtered, introduced into about 500 parts of hot water and the solution is mixed with a solution prepared from 28 parts of crystallized copper sulfate and about 60 parts of aqueous ammonia of 20 per cent strength. The copper compound thus formed is filtered and dried. It dyes cotton or regenerated cellulose reddish-yellow shades which are very fast to light.

Example 2

21.8 parts of 1-phenyl-3-methyl-5-pyrazolone-4'-carboxylic acid and 24 parts of dehydrothiotoluidine are heated in 200 parts of chlorobenzene to 120–130° C. and 10 parts of phosphorus trichloride are introduced into the mixture within about 1 hour. Condensation is continued for about 8 hours in boiling chlorobenzene until evolution of hydrogen chloride ceases. The chlorobenzene is then removed by steam distillation and the residue is filtered with suction and dissolved with the addition of alcohol in dilute sodium hydroxide solution in which it is somewhat sparingly soluble. The solution is filtered and the new pyrazolone is isolated by acidifying the filtrate.

44 parts of the pyrazolone thus obtained having probably the formula

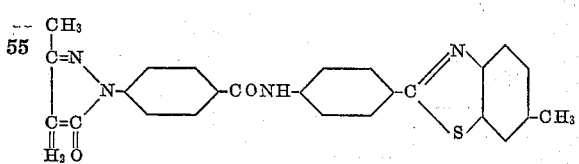

are dissolved in an aqueous sodium hydroxide solution corresponding to one equivalent of sodium hydroxide with the addition of some alcohol. 10 parts of anhydrous sodium carbonate are added and the solution is coupled with the diazo-compound from 21.7 parts of 1-amino-4-sulfobenzene-2-carboxylic acid. When coupling is finished, if required after heating for a short while, the dyestuff which has partially separated is completely salted out and filtered with suction.

The dyestuff is then converted into a complex copper compound by treatment with an agent yielding copper. The copper compound is a yellow powder. It is advantageously produced on the fiber after this has first been dyed with the non-metallized dyestuff. In this manner yellow dyeings of good fastness to washing and light are obtained.

Example 3

24 parts of dehydrothiotoluidine are diazotized with an aqueous solution of 7 parts of sodium nitrite after addition of 30 parts of hydrochloric acid (specific gravity 1.15). The diazo-solution is filtered and there are then added at about 0° C. 50 parts of hydrochloric acid (specific gravity 1.15) and following this a stannous chloride solution corresponding with 45 parts of $SnCl_2 2H_2O$. The whole is stirred for about 2 hours and the hydrazine formed is filtered with suction.

The hydrazine is stirred with about 200 parts of water, the whole is heated to about 50° C., neutralized with dilute sodium hydroxide solution until faintly acid to Congo red and then condensed with 13 parts of ethyl aceto-acetate, the liberated acid being neutralized. After some hours the whole is diluted with about 100 parts of water, 50 parts of caustic soda solution of 36° Bé. are added and the whole is boiled for about one hour and filtered, and the pyrazolone formed is precipitated from the filtrate by addition of hydrochloric acid.

30.7 parts of the pyrazolone so obtained are dissolved in a dilute aqueous sodium hydroxide solution corresponding to one equivalent of sodium hydroxide, 10 parts of anhydrous sodium carbonate are added and the solution is coupled as described in the preceding example with the diazo-compound from 21.7 parts of 1-amino-4-sulfobenzene-2-carboxylic acid. The dyestuff of the formula

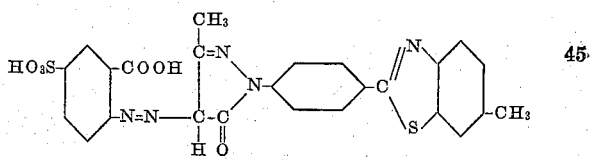

is precipitated in the usual manner. After treatment with an agent yielding copper it constitutes a yellow powder. If the dyestuff is coppered on the fibre there are obtained yellow dyeings of good properties of fastness.

The isomeric dyestuff obtained from diazotized anthranilic acid 3-methyl-5-pyrazolone from dehydrothiotoluidine sulfonic acid behaves similarly, whereas the product of the formula

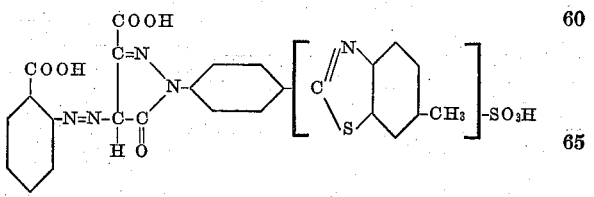

leads to essentially redder tints.

The complex copper compound of the corresponding dyestuff from the same pyrazolone derivative and diazotized 2-aminophenolsulfonic acid is a brownish yellow powder.

Example 4

The sodium salt corresponding with 32 parts of dehydrothiotoluidine-mono-sulfonic acid and 21 parts of 1-(3'-amino)-phenyl-5-pyrazolone-3-carboxylic acid are dissolved in about 1000 parts of water with addition of 20 parts of anhydrous sodium carbonate, and the solution is treated with phosgene at about 40° C. When the formation of the urea derivative is finished, the reaction product which has precipitated is filtered with suction and dried.

56.5 parts of the unsymmetrical urea thus prepared are dissolved in 200 parts of water together with the necessary quantity of anhydrous sodium carbonate and coupled in the usual manner with the diazo-compound prepared from 21.7 parts of 1-amino-4-sulfobenzene-2-carboxylic acid. After the dyestuff of the formula

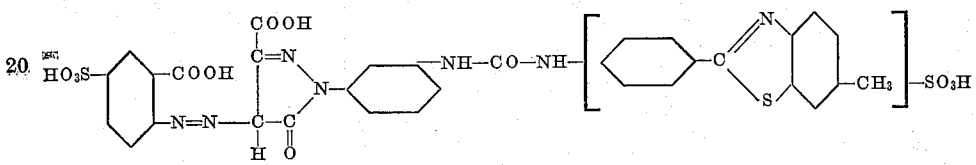

has been filtered with suction it is introduced with the addition of sodium chloride into about 500 parts of hot water and converted into the complex copper compound by treatment with a solution prepared from 28 parts of crystallized copper sulfate and about 60 parts of aqueous ammonia of 20 per cent strength.

The copper compound is filtered and dried. It is a brown-yellow powder which dyes vegetable fibers fast yellow shades.

The complex copper compound of the corresponding dyestuff from diazotized 2-aminobenzene-1-carboxylic acid is likewise a brown-yellow powder. When produced on the fiber this copper compound gives yellow shades of good fastness to washing and light.

Similar dyestuffs are obtained if instead of the unsymmetrical pyrazolone-urea compound the tertiary condensation product from cyanuric chloride and 1-(4'- or 3'-amino)-phenyl-3-methyl- or -3-carboxy-5-pyrazolone, dehydrothiotoluidine-mono-sulfonic acid and aniline is combined with ortho-hydroxy- or ortho-carboxy-diazo-compounds and the azo-dyestuffs so obtained are treated in substance or on the fiber with agents yielding copper. Such dyestuffs are for example the products of the formulas (a) 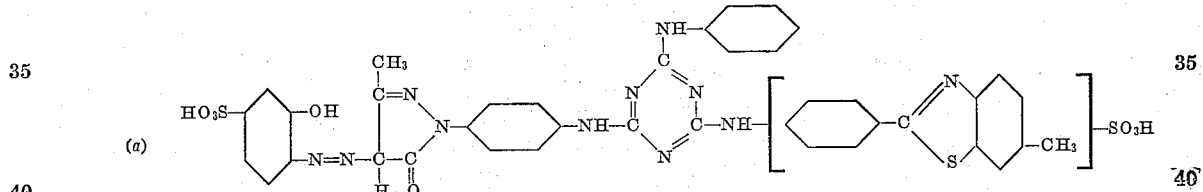

or (b) 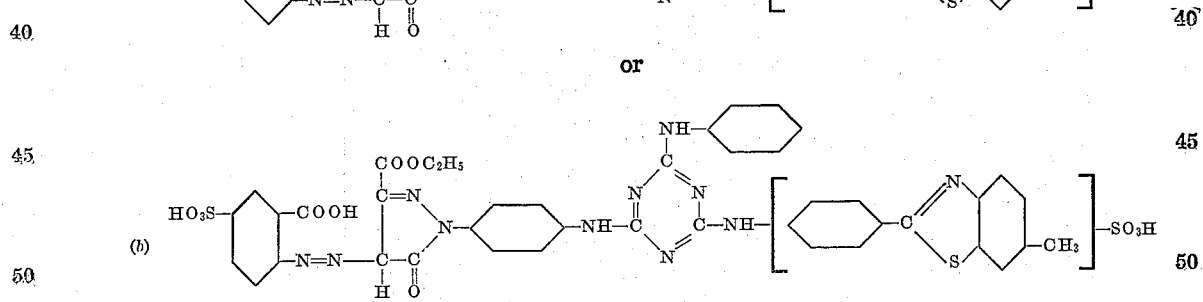

or (c) 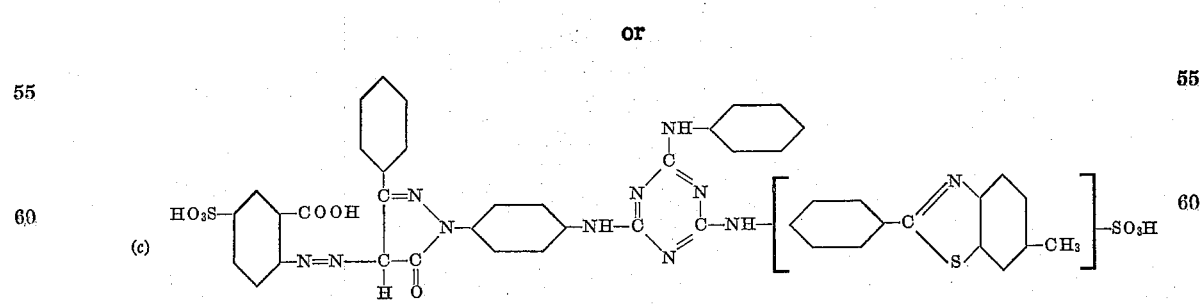

or (d) 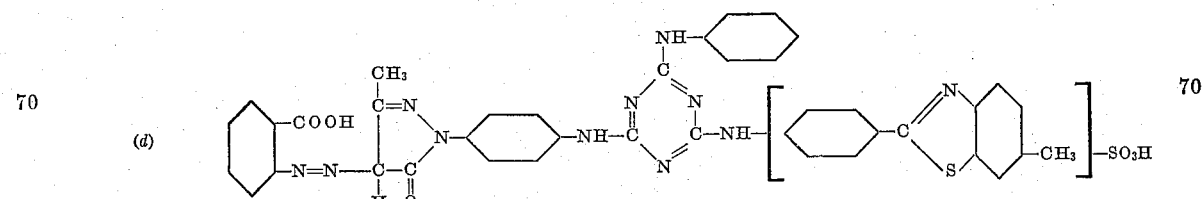

or

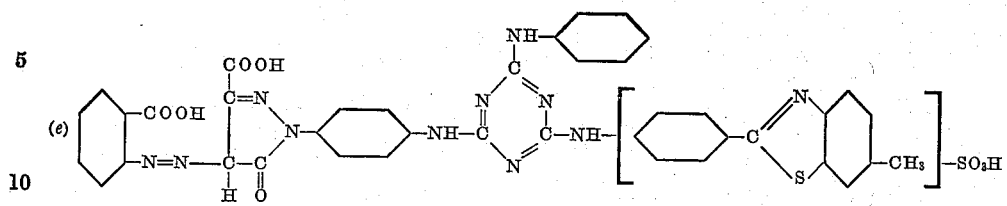

Such a tertiary condensation product may be obtained, for example, as follows:

18.4 parts of cyanuric chloride are dissolved in a small quantity of acetone, and the solution is introduced into about 100 parts of ice cold water. To the cold fine suspension of cyanuric chloride is added a neutral solution of the sodium salt from 32 parts of dehydrothiotoluidine-monosulfonic acid. Condensation is conducted at about 0° C. for one hour, 8.4 parts of sodium bicarbonate being slowly added for neutralizing the liberated acid.

To the primary condensation mixture are added 21.9 parts of 1-(3'-amino)-phenyl-5-pyrazolone-3-carboxylic acid and 8.4 parts of sodium bicarbonate, and the whole is heated to about 50° C. Within about 3 hours a secondary condensation product has been formed. The reaction mixture is then heated to boiling for about one hour longer with 15 parts of aniline, then distilled for a short time with steam in order to expel the excess of aniline, and the pyrazolone condensation product having the probable formula

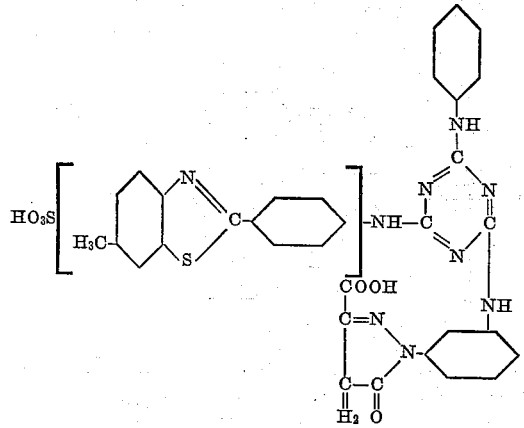

is isolated by acidifying.

Example 5

37.1 parts of 6-sulfo-1:2-naphtho-$\mu$-(3'-amino)-phenylthiazole (prepared as described in Example 1 of German specification No. 165,126) are dissolved in the form of the sodium salt in about 500 parts of water and benzoylated at about 60° C. with 19 parts of para-nitrobenzoyl chloride with the addition of 10 parts of anhydrous sodium carbonate. When condensation is finished the para-nitrobenzoyl compound is precipitated, stirred together with about 400 parts of water and reduced with a sodium hydrosulfide solution corresponding to 15 parts of NaHS. The amino-compound thus obtained, having probably the formula

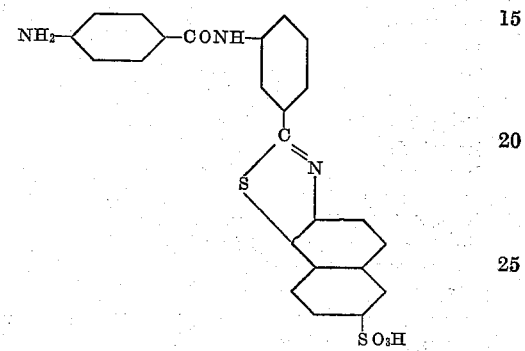

is salted out and filtered. It is then taken up with water, diazotized in the usual manner and the diazo-compound is treated with a stannous chloride solution, acid with hydrochloric acid, until the mixture no longer gives the diazo-reaction. The hydrazine compound thus prepared, if required after it has been precipitated and again taken up in water, is converted into the corresponding 3-methyl-5-pyrazolone by condensation with 13 parts of ethyl aceto-acetate.

57 parts of the new pyrazolone derivative are coupled in the usual manner in the presence of sodium carbonate with the diazo-compound from 21.7 parts of 2-amino-4-sulfobenzene-1-carboxylic acid. The complex copper compound prepared by treating the resulting dyestuff with an agent yielding copper is a yellow powder. When produced on the fibre the new copper compound gives fast yellow shades.

Similar yellow to orange-yellow and brown-orange dyestuffs can be obtained by exchanging the diazo-compound of 2-amino-4-sulfobenzene-1-carboxylic acid for the diazo-compound of 2-aminobenzene-1-carboxylic acid or of an ortho-aminophenol or of a sulfonic acid thereof.

The procedure is similar for making dyestuffs from the other parent materials mentioned in the introduction.

Example 6

Material is dyed with 3 per cent of the dyestuff of Example 1 in the manner usual for direct dyestuffs with the addition of sodium carbonate. There are obtained reddish yellow shades distinguished by their intensity and their excellent fastness to alkali.

Example 7

Viscose or cuprammonium artificial silk is dyed with 2 per cent of the dyestuff of Example 1 in the usual manner for dyeing artificial silk of regenerated cellulose. There are obtained reddish yellow shades distinguished by their beauty and fastness to alkali. The dyeings obtained on streaky viscose artificial silk are distinguished by their uniformity.

Example 8

100 parts of cotton are introduced into a dye bath consisting of 3,000 parts of water, 2 parts of calcined sodium carbonate and 1 part of the sodium salt of the dyestuff of Example 1 at a temperature of 40–50° C.

The temperature is raised to 90–95° C. in the course of 20 minutes–½ hour, 30–40 parts of crystallized Glaubers salt are added and dyeing is continued for about one hour longer, whilst the bath is maintained gently boiling. There is then added to the dye bath a solution prepared from 1–2 parts of crystallized copper sulfate and 2 parts of sodium tartrate which has been rendered feebly alkaline with sodium carbonate, and the material is treated in the same bath for about ½ hour at a temperature of from 95° C. up to boiling temperature. After this time the dye bath is practically completely exhausted. The material is then handled for ½ hour at 50° C. in a soap bath containing 5 grams of soap per litre. The material is then washed and dried. It is dyed a yellow shade of very good fastness to washing.

What I claim is:

1. The metal compounds of the azo-dyestuffs which are characterized, on the one hand, by the presence of an azo-dyestuff grouping of the general formula

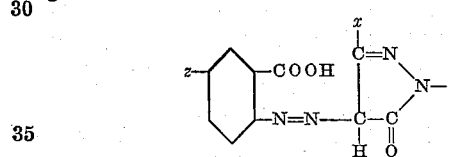

wherein $z$ stands for a member of the group consisting of $SO_3H$ and $H$, and $x$ stands for a substituent selected from the group consisting of $CH_3$, $COOH$, $COO$-alkyl and phenyl, and, on the other hand, by an atom grouping of the formula

wherein the valency designated with ← is linked to the 1-position of the pyrazolone nucleus, one $t$ stands for a hydrogen atom and the other $t$ stands for a radical characterized by the atom grouping

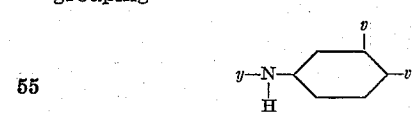

in which one $v$ stands for a hydrogen atom and the other $v$ stands for an atom grouping

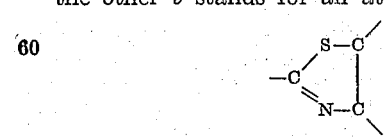

in which the carbon atom which is simultaneously bound to the sulfur atom and the nitrogen atom is linked to the benzene nucleus of the radical $t$ and in which the two adjacent carbon atoms belong to an aromatic ring selected from the group consisting of aromatic rings of the benzene and naphthalene series, and $y$ stands for a connecting member selected from the group consisting of

and

$a$ standing for a member of a connecting link selected from the group consisting of a carbonyl group and a triazine compound, and the linkage designated with ← being that linkage which units the connecting member with the aromatic nucleus of the benzene series standing in 1-position of the pyrazolone nucleus, which products are yellow to brown powders dyeing the fiber fast yellow tints, also when produced on the fiber itself.

2. The copper compounds of the azo-dyestuffs which are characterized, on the one hand, by the presence of an azo-dyestuff grouping of the general formula

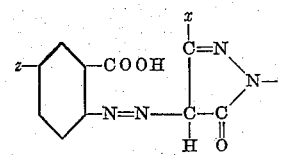

wherein $z$ stands for a member of the group consisting of $SO_3H$ and $H$, and $x$ stands for a substituent selected from the group consisting of $CH_3$, $COOH$, $COO$-alkyl and phenyl, and, on the other hand, by an atom grouping of the formula

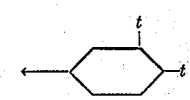

wherein the valency designated with ← is linked to the 1-position of the pyrazolone nucleus, one $t$ stands for a hydrogen atom and the other $t$ stands for a radical characterized by the atom grouping

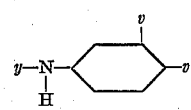

in which one $v$ stands for a hydrogen atom and the other $v$ stands for an atom grouping

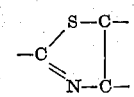

in which the carbon atom which is simultaneously bound to the sulfur atom and the nitrogen atom is linked to the benzene nucleus of the radical $t$ and in which the two adjacent carbon atoms belong to an aromatic ring selected from the group consisting of aromatic rings of the benzene and naphthalene series, and $y$ stands for a connecting member selected from the group consisting of

and

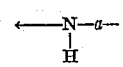

$a$ standing for a member of a connecting link selected from the group consisting of a carbonyl group and a triazine compound, and the linkage designated with ← being that linkage which unites the connecting member with the aromatic nucleus of the benzene series standing in 1-position of the pyrazolone nucleus, which products are yellow powders dyeing the fiber fast yellow tints, also when produced on the fiber itself.

3. The copper compounds of the azo-dyestuffs which are characterized, on the one hand by the presence of an azo-dyestuff grouping of the general formula

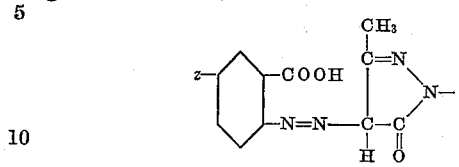

wherein $z$ stands for a member of the group consisting of $SO_3H$ and $H$, and, on the other hand, by an atom grouping of the formula

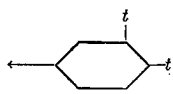

wherein the valency designated with ← is linked to the 1-position of the pyrazolone nucleus, one $t$ stands for a hydrogen atom and the other $t$ stands for a radical characterized by the atom grouping

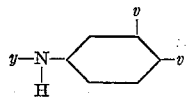

in which one $v$ stands for a hydrogen atom and the other $v$ stands for an atom grouping

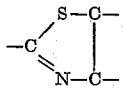

in which the carbon atom which is simultaneously bound to the sulfur atom and the nitrogen atom is linked to the benzene nucleus of the radical $t$ and in which the two adjacent carbon atoms belong to an aromatic ring selected from the group consisting of aromatic rings of the benzene and naphthalene series, and $y$ stands for a connecting member selected from the group consisting of

and

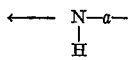

a standing for a member of a connecting link selected from the group consisting of a carbonyl group and a triazine compound, and the linkage designated with ← being that linkage which unites the connecting member with the aromatic nucleus of the benzene series standing in 1-position of the pyrazolone nucleus, which products are yellow powders dyeing the fiber fast yellow tints, also when produced on the fiber itself.

4. The copper compounds of the azo-dyestuffs which are characterized, on the one hand, by the presence of an azo-dyestuff grouping of the general formula

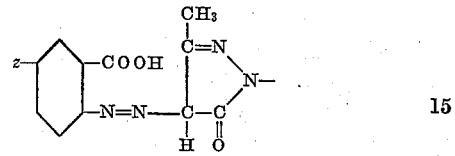

wherein $z$ stands for a member of the group consisting of $SO_3H$ and $H$, and, on the other hand by an atom grouping of the formula

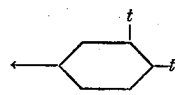

wherein the valency designated with ← is linked to the 1-position of the pyrazolone nucleus, one $t$ stands for a hydrogen atom and the other $t$ stands for a radical characterized by the atom grouping

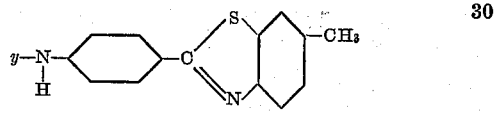

in which $y$ stands for a connecting member selected from the group consisting of

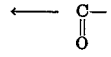

and

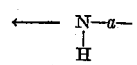

a standing for a member of a connecting link selected from the group consisting of a carbonyl group and a triazine compound, and the linkage designated with ← being that linkage which unites the connecting member with the aromatic nucleus of the benzene series standing in 1-position of the pyrazolone nucleus, which products are yellow powders dyeing the fiber fast yellow tints, also when produced on the fiber itself.

5. The copper compound of the azo-dyestuff of the formula

MAX SCHMID.